Figure 4:
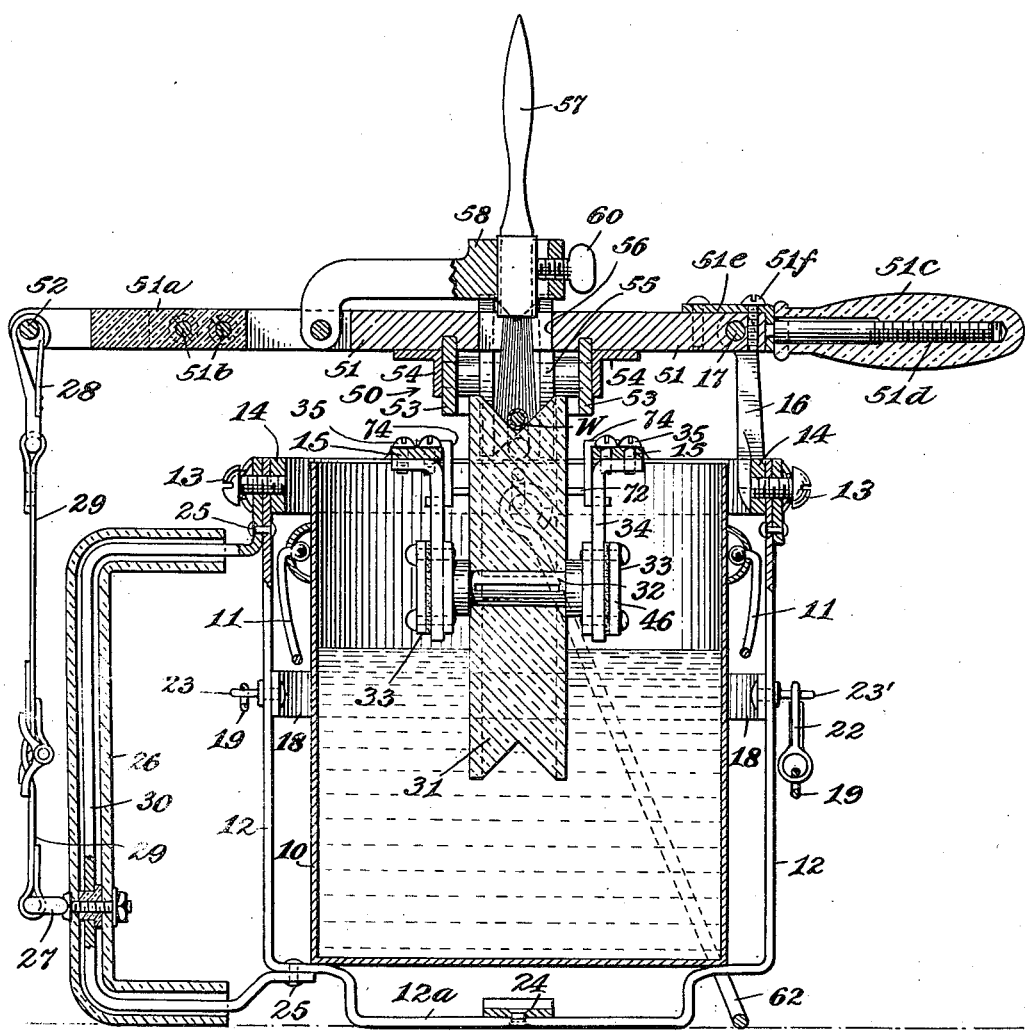

Sept. 3, 1940.  H. GREENE  2,213,670
WIRE RECOATER
Filed Dec. 8, 1937  3 Sheets-Sheet 1
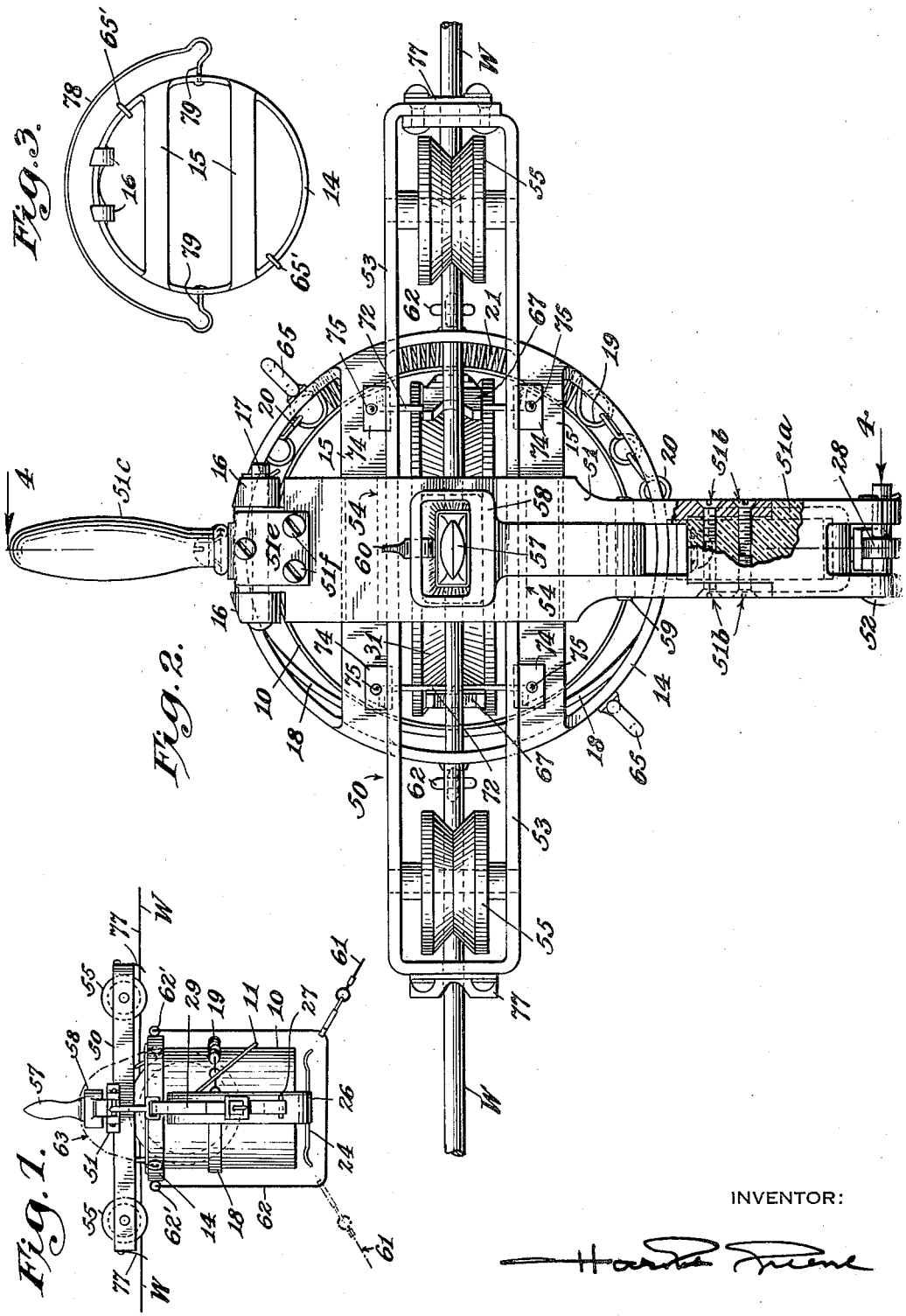
INVENTOR:

Sept. 3, 1940.     H. GREENE     2,213,670
WIRE RECOATER
Filed Dec. 8, 1937     3 Sheets-Sheet 2

INVENTOR:
Harold Greene

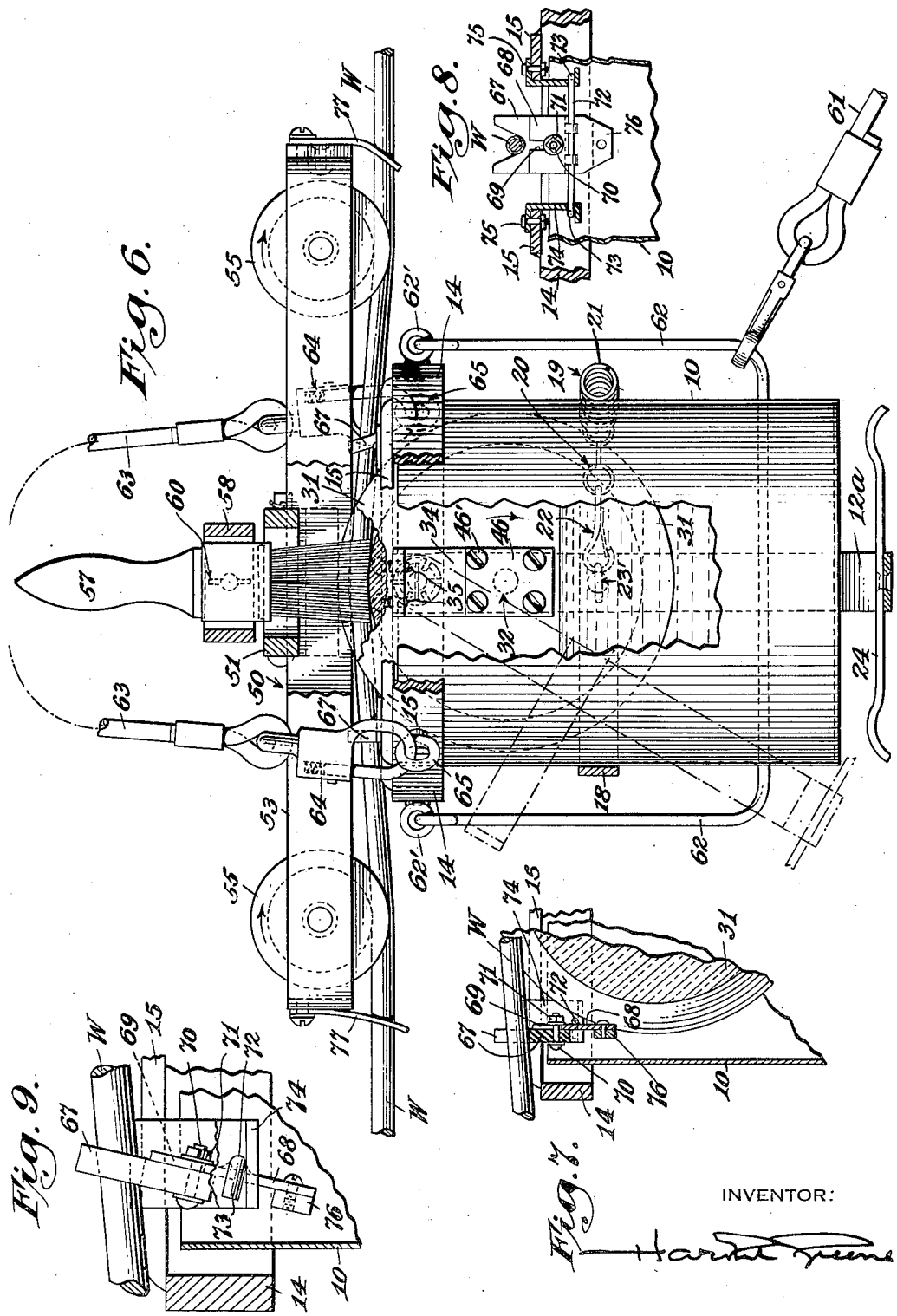

Patented Sept. 3, 1940

2,213,670

UNITED STATES PATENT OFFICE 2,213,670

WIRE RECOATER

Harold Greene, Williams, Ariz.

Application December 8, 1937, Serial No. 178,646

8 Claims. (Cl. 91—33)

My invention relates to wire recoater and has for its object the recoating of overhead insulated wires already installed, with a suitable weatherproof liquid or paint, before the said insulation becomes so badly damaged by exposure to the elements, that the wire may have to be taken down and replaced with new wire.

The device may likewise be used to coat or recoat with liquid any overhead single cable of any kind.

It is designed to be used with a commercial paint pail, preferably, 1 U. S. gallon size, but obviously may be adapted to any particular shape of container desired.

Briefly, it comprises a frame adapted to hold the pail, and a distributing wheel emersed in the liquid in the pail, said wheel being held in contact with the wire or cable to be recoated by a pair of grooved wheels set in tandem relation and adapted to ride on the wire and by which the device is suspended.

A self adjusting brush mounted over said distributing wheel and the wire to be recoated and in contact therewith, is adapted to spread the liquid on the wire when the device is drawn along said wire by a light rope attached to the device and extending therefrom to the hands of an operator who may be on the next pole or on the ground and who will walk from pole to pole and pull the device after him.

When the pole is reached, the operator will ascend the pole, remove the device from the wire, remount it again on the other side of the pole insulator, descend and continue recoating the line. The wire adjacent the pole, may be recoated by hand painting as usual.

Various methods may be used to suit the conditions. The most economical would probably be for an experienced operator to do the overhead work and have a helper on the ground to pull the device along. In some cases it would be more suitable for operators to be on two neighboring poles and pull the device back and forth keeping their two ropes attached at all times.

Figure 5:
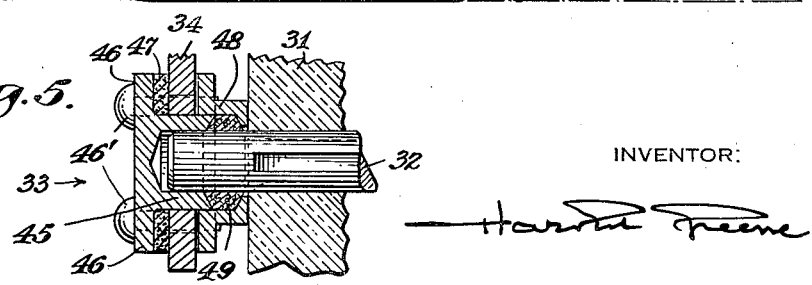

Means are provided for removing the "drip" from the wire and returning it to the pail. The device is suitably insulated to protect the operator from short-circuiting a live wire. A flexible handle is provided to hand carry the device when off the wire and a pedestal to support it when placed on the ground. Other expedients leading to perfection in operation of the device will be explained as the specification proceeds and will be referred to in the drawings, in which:

Fig. 1 is a miniature side elevation of the recoater mounted on the wire to be recoated, Fig. 2 is a top plan view of the recoater, Fig. 3 is a miniature plan view of a modification, Fig. 4 is a vertical transverse section as indicated on the line 4—4 in Fig. 2, Fig. 5 is a detail of one of the liquid-proof bearings, Fig. 6 is a side elevation partly in section of the device; the towing bail being partly raised to include same in the figure, Fig. 7 is a detail longitudinal section of the means for removing the "drip" from the wire, Fig. 8 is a transverse view of Fig. 7, and Fig. 9 is an enlarged detail side elevation of the drip remover in the alternate position.

Referring to Fig. 4: 10 is a standard U. S. gallon paint pail with cover removed and having the usual bail 11. The pail partly filled with recoating liquid is mounted in the recoater supported by a rockable U frame 12, depending pivotally from screws 13—13, secured in an annular frame 14, preferably a casting of light metal. This frame is provided with a pair of cross-bars 15—15, integral therewith and upstanding lugs 16—16, provided with a pivot 17, adapted to pivotally support a trolley carriage 50, hereinafter described.

The side members of the frame 12, are connected by a semicircular bar 18, adapted to confine the pail 10, on one side and in position within the U frame 12. The other side of the pail is confined by an elastic strap 19, one end of which is anchored to a screw eye 23.

The screw eye 23, is mounted in one of the arms of the frame 12 and the strap 19 comprising a chain 20, an intermediate spring 21 and a snaphook 22 passes around the pail where the snap 22 engages a screw eye 23' mounted in the other arm of the U frame. See Figs. 1-4.

The bottom or connecting member of the U frame 12, has a depressed portion 12a, to which is secured at right angles thereto, a foot-piece 24, which with the portion 12a, form a cruciform pedestal on which the recoater may rest when on the ground.

A handle 30, is secured to one of the arms of the U frame 12 as by rivets 25—25, and it may be covered by insulation such as hard rubber or rubber tubing 26. The handle 30 may be provided with an insulated screw eye 27, to which may be anchored an adjustable strap 29, the other end of which is provided with a snap hook 28, adapted to be secured to a pin 52, in an insulating end block 51a, secured to a transverse member 51, hereinafter described.

From the foregoing, it is apparent that the pail of liquid may be positioned in the device by rocking out the U frame 12, as shown in broken lines in Fig. 6, pushing the pail up and within the annular frame 14, rocking the frame 12, back to the vertical position so that the lower member 12a is under the pail and the bar 18 touching the side of the pail and finally securing the elastic strap 19 to the screw eye 23' by means of the snap hook 22.

The trolley carriage 50, comprises a transverse member 51, which is pivoted between the lugs 16, by the pivot 17. A rectangular frame 53, formed from strap metal may be mounted directly under the transverse member 51, and the sides of said frame may be let into the transverse member and secured thereto by the angles 54, spot welded or otherwise attached.

The carriage 50, is provided with grooved wheels 55, mounted inside of the frame 53. These wheels are adapted to ride on the wire (W) to be recoated. The transverse member 51 of the carriage 50, is apertured as at 56, to provide entrance for a brush 57, which may be mounted in a frame 58, pivoted to a pin 59, in the member 51. A set screw 60, holds said brush in position. The weight and center of gravity of this frame 58, is such that the brush 57, will rest on the wire W, and in the groove of the distributing wheel 31, with sufficient pressure to wipe up the paint adhering to the wheel as it revolves. The end of the transverse member 51, above the handle 30, is provided with the insulating block 51a, which may be of Bakelite, fibre or similar material. This block is secured to the member 51, by screws 51b.

The other end of the member 51, is provided with an insulated handle 51c, mounted on a post 51d, which is secured to a bracket 51e, said bracket being secured to the member 51 by screws 51f.

A grooved distributing wheel 31, is positioned centrally of the two wheels 55, and in line therewith the perimeter of the grooved portion of the wheel 31, overlaps a straight line tangent to and between the perimeters of the grooves in the wheels 55—55; so that when the device is in position, the wire W, irrespective of its size, will pass under the wheels 55 and over the wheel 31, with sufficient tension thereon to give traction to the wheel 31 when the device is pulled along the wire W. The wheel 31, may be of wood or molded insulating material mounted and keyed to an axle 32.

The wheel 31, is mounted in bearings 33, in depending arms 34—34, which are secured to the under surface of the cross-bars 15—15, by screws 35. In order to keep the bearings 33, free from the coating liquid, I have provided a simple stuffing box which is shown in detail in Fig. 5. It comprises a bearing cylinder 45, (of bronze or other anti-friction metal) having a rectangular flange 46. The cylinder 45, is mounted in an aperture in the arm 34, and a rectangular felt washer 47, surrounds the cylinder 45 and fills the space between the flange 46 and the surface of the arm 34. A flanged box 48, is mounted on the cylinder 45, between the arm 34 and the wheel 31, and it contains suitable ring packing 49.

The ring packing 49, surrounds the axle 32, and is adapted to be compressed between the ends of the cylinder 45, and the box 48, by means of screws 46' which serve to draw the flanges together and effect a seal and exclude any liquid from the bearings.

The recoater may be drawn along the wire W, by means of a tow line 61, (see Figs. 1 and 6) which may be provided with a snap hook for readily attaching same to a bail 62, pivoted in and between screw eyes 62'—62', mounted diametrically opposite each other on the annular frame 14. The tow line 61 will slide on the bail 62 so that the device may be pulled in either direction by the same line. The bail 62 may be rocked to one side when the device is resting on the ground. (Fig. 4.)

Means for carrying the device consists of a flexible handle 63, having snap hooks 64, adapted to fasten to screw eyes 65, secured at opposite points on the annular frame 14. The handle 63, being over the wire W, provides a safety should one's hold slip when adjusting the device on the wire W.

After the wire W, has received the coat of liquid from the wheel 31, and the brush 57, a "drip" accumulates on the sides of the wire which slowly moves toward the bottom of the wire and would finally drop to the ground but for the means which I have provided for returning it to the pail. I locate this means on each side of the wheel 31, so that either one or the other will operate as the recoater is pulled in one direction or the other.

It comprises a wiper 67, preferably of flexible rubber and having a V slot in the upper edge thereof adapted to slide under the wire W, and engage the sides thereof. The wiper 67, is adjustably mounted on a metal plate 68, which is slotted as at 69, to receive a bolt 70, which passes through the wiper 67, and which may be adjusted relative to the plate 68, by a nut 71. The plate 68 has a transverse rock shaft 72, secured to it as by spot welds and the ends of said shaft 72, are turned toward the wiper to form toes 73.

The shaft 72 may be mounted through holes in channel brackets 74, which are secured to the cross bars 15—15 of the frame 14, by bolts 75. The lower end of the plate 68, has secured thereto, a counterweight 76, of sufficient size to hold the wiper in a vertical plane when hanging free on the rock shaft 72. When the wiper is in the vertical plane the toes 73 will engage the lower flange of the channel 74 and permit the wiper to rock in only one direction, (that is, toward the wheel 31) so that one or the other of the wipers will remain in the vertical plane to effect a wiping of the wire W, when the recoater is pulled in either direction. Conversely, one or the other of the wipers will rock away from the wire W, and into an inactive position as shown in Fig. 9. Thus when the recoater is pulled from left to right as in Fig. 6, the wiper on the left will operate to remove the "drip." (See Figs. 7 and 8.)

In use, I find that the trailing wheel 55, of the carriage 50, mars the surface of the freshly painted wire W, as it passes over it, and to overcome this objection, I provide a sheet rubber wiper 77, secured to each end of the carriage and notched to fit over the wire W. The forward wiper 77, will bend back slightly under the carriage and the rear wiper 77, will trail the carriage, lightly contacting the freshly painted wire W, and eliminating any mar caused by the wheel 55.

In Fig. 3, I show a modification of the bail 62. This may be a wire 78, formed in a semicircle with the diametrical ends 79, thereof rigidly mounted in the frame 14. Adjacent the ends 79, open loops are formed with the wire adapted to engage the snap hook of the tow line 61. Thus the line may be used to pull the recoater in either direction and from a point near the carriage 50, which is preferable. When using this type of bail I prefer to mount the eyes 65' on the top of the frame 14, as shown in Fig. 3.

In use the pail 10, is placed within the device as previously described. The operator may then carry it by the handle 63, to the pole and if necessary may then rest it on the ground by means of the pedestal formed by the foot-piece 24, and the portion 12a, of the U frame 12. Then carrying the device with him he ascends the pole, unfastens the strap 29, and swings the carriage 50, back on the pivot 17. He then places the device under the wire W, so that the wire lies within the groove of the roller 31; he then swings the carriage over the wire and fastens it by means of the hook 28, and if necessary the tension is then set by the adjustable strap 29. He then attaches the tow line 61, to the bail 62, or he may have done this before ascending the pole.

The recoater is now ready to be drawn along the wire by means of the towline 61. As this takes place, the liquid is carried up by the wheel 31, to the wire W, and the brush 57. The latter overlies the wire W, on the top and the sides and dams up the liquid thus forming a pool through which the wire passes. The "drip" will be scraped off by the wiper 67, and will return to the pail.

The device may be quickly taken apart for cleaning: The carriage may be removed by pulling out pivot pin 17; the brush 57 removed and placed in a suitable solvent such as kerosene. The wheel brackets 34 and wheel 31, may be quickly removed by removing screws 35, in the cross bars 15. The bearings being packed will exclude the paint and also the solvent. Between day jobs the recoater may be left in a pail of water to prevent drying and gumming too thick to work with.

Modifications within the scope of the claims may be made in the construction without departing from the spirit of the invention. For instance: I may substitute for the strap 29, an elastic connection having a coil spring similar to 21, used with the chain 20, and thus avoid the adjustment necessary by the buckle of the strap 29.

I claim:

1. The combination with a trolley for riding over a wire or the like, of an annular substantially horizontal frame depending from said trolley and below said wire, an underframe pivotally depending from said annular frame for supporting a pail and open along one side to enable a pail to be inserted in said underframe when the same has been swung to one side of its normal position, means engaging a pail on the open side of the underframe for holding it therein, and means supported by said trolley and annular frame for raising liquid in a pail and coating said wire.

2. The combination with a trolley adapted to ride over a tensioned member, of a liquid container carried thereby below said member, a paint brush adjustably mounted at one end of a frame pivoted at its opposite end on said trolley above said container, and free to swing about said pivot and in response to gravity yieldingly press said brush against said tensioned member and effect a wiping engagement therewith, a wheel for raising liquid from said container to said brush for distribution thereby to coat said member, means for supporting said wheel within said container, and means for wiping excess coating and any wheel marks from said member.

3. An apparatus for coating a flexible tensioned member comprising a trolley riding over said member, a liquid container carried thereby, a paint brush supported in a frame and normally in contact with said member to be coated, the width of said brush being greater than its thickness and being aligned with said member, said frame being pivotally mounted above said container and capable of being rocked transversely of said member to lift the brush out of contact therewith.

4. The combination with an underframe adapted to support a removable liquid container, of an overframe pivoted to said underframe and provided with a pair of spaced trolley wheels, a wheel carried by the underframe for engagement with the opposite side of a track on which said trolley wheels travel, said overframe being capable of being moved away from said underframe to attach said frames to said track, means for holding said frames together on said track, a sub-frame pivoted adjacent one end of said overframe, and a brush secured to the other end thereof, said sub-frame being capable of being rocked to lift said brush without separation of the underframe and overframe.

5. In a liquid coating apparatus, an overframe having trolley wheels, an underframe beneath the track on which said trolley rides, means for separating said frames for attaching them to said track, means for holding them together on said track, means for removably carrying a liquid container in said underframe, means for supplying liquid to said track, and distributing means for coating said track, consisting of a sub-frame pivoted to said overframe and supporting a brush, and capable of being rocked to lift said brush away from said track without separation of the underframe and overframe, and means for returning excess liquid from said track to said container.

6. A liquid coating apparatus comprising an overframe containing spaced trolley wheels for supporting said apparatus from a flexible tensioned track adapted to be coated, an underneath frame beneath said track pivoted to the overframe on an axis substantially parallel thereto whereby said frames may be separated for attachment to said track, said underframe including an annular frame and a depending frame pivoted thereto for supporting a liquid container, said depending frame being capable of being swung to one side to allow insertion of a liquid container into the annular frame from below it, a flexible tension means for holding the liquid container in said depending frame, means for holding the over and under frames together, a fountain grooved roll carried by the annular frame, a brush pivotally secured in said overframe for engagement with said track and grooved roll, a flexible wiper on each side of said brush for removing excess liquid and returning it to said liquid container regardless of the direction in which said apparatus is moved along said track, and a smoothing wiper at each end of said apparatus beyond said wheels for removing any wheel marks from said track.

7. An apparatus for applying liquid to a flexible tensioned member along which said apparatus is movable, an overframe containing spaced trolley wheels for supporting said apparatus on said tensioned member, an underneath frame pivoted to the said overframe for separation of said frames to receive said tensioned member, and a liquid container carried by said underneath frame, a brush removably supported in a frame pivotally secured to said overframe, a grooved roll in said liquid container journalled in said underneath frame and in contact with said tensioned member and rotatable thereby to convey liquid to said brush, a wiper between said wheels adapted to engage the lower surface only of said tensioned member and remove excess liquid therefrom, and a lagging wiper outside said wheels adapted to engage the upper surface only of said member and smooth the liquid on same to remove any wheel marks therefrom.

8. An apparatus for applying liquid coating to a tensioned wire or the like while the same is substantially straight, and comprising a liquid container, a trolley riding on said wire, means for supporting said container below said wire from said trolley, a grooved wheel journalled within said container in contact with said wire, and a brush for distributing said liquid to coat said wire removably supported above same in engagement therewith and with said wheel, and a wiper between the wheels of said trolley consisting of a member for engaging said wire adjustably mounted on a support, said support being pivotally mounted on said container supporting means, whereby said wiper may lightly engage the lower surface of said wire when the apparatus is moved along same, and tilt away from said wire upon similar movement of the apparatus in an opposite direction.

HAROLD GREENE.